(12) United States Patent
Panda et al.

(10) Patent No.: US 10,955,311 B2
(45) Date of Patent: Mar. 23, 2021

(54) APPARATUS AND METHODS TO DETERMINE STRESSES IN COVER GLASS OF HANDHELD DEVICES

(71) Applicant: CORNING INCORPORATED, Corning, NY (US)

(72) Inventors: Prakash Chandra Panda, Ithaca, NY (US); Jonathan David Pesansky, Corning, NY (US); Praveen Reddy Samala, Painted Post, NY (US); Adam Carver Skillings, Dansville, NY (US)

(73) Assignee: CORNING INCORPORATED, Corning, NY (US)

( * ) Notice: Subject to any disclaimer, the term of this patent is extended or adjusted under 35 U.S.C. 154(b) by 84 days.

(21) Appl. No.: 15/777,451

(22) PCT Filed: Nov. 4, 2016

(86) PCT No.: PCT/US2016/060489
§ 371 (c)(1),
(2) Date: May 18, 2018

(87) PCT Pub. No.: WO2017/087184
PCT Pub. Date: May 26, 2017

(65) Prior Publication Data
US 2018/0328814 A1      Nov. 15, 2018

Related U.S. Application Data

(60) Provisional application No. 62/256,855, filed on Nov. 18, 2015.

(51) Int. Cl.
*G01M 11/08*        (2006.01)
*G01N 3/303*        (2006.01)
(Continued)

(52) U.S. Cl.
CPC ............ *G01M 11/081* (2013.01); *G01M 7/08* (2013.01); *G01N 3/068* (2013.01); *G01N 3/303* (2013.01);
(Continued)

(58) Field of Classification Search
None
See application file for complete search history.

(56) References Cited

U.S. PATENT DOCUMENTS 6,766,046 B1    7/2004  Saito et al.
8,939,037 B2    1/2015  Shah et al.
(Continued)

FOREIGN PATENT DOCUMENTS

CN      2738229 Y      11/2005
CN    101566465 A      10/2009
(Continued)

OTHER PUBLICATIONS

Machine English Translation of CN101655352 (Year: 2010).*
(Continued)

*Primary Examiner* — Mohammed Jebari
(74) *Attorney, Agent, or Firm* — Kevin M. Johnson

(57) ABSTRACT

Apparatus and methods of for measuring stress incurred by a cover glass of a handheld device when the cover glass contacts a surface during a drop event. A transparent solid piece of material with a drop surface and a back surface is provided and oriented to receive a dropped handheld device so that the cover glass contacts the drop surface. At least two optical detectors are directed at the back surface of the transparent material to obtain image data including a plurality of pixel points.

20 Claims, 1 Drawing Sheet

(51) Int. Cl.
*G01N 3/06* (2006.01)
*G06T 7/73* (2017.01)
*H04N 5/247* (2006.01)
*G01M 7/08* (2006.01)
*G01N 21/958* (2006.01)

(52) U.S. Cl.
CPC ............ *G01N 21/958* (2013.01); *G06T 7/74* (2017.01); *H04N 5/247* (2013.01); *G01N 2203/0647* (2013.01)

(56) References Cited

U.S. PATENT DOCUMENTS

| | | | | |
|---|---|---|---|---|
| 2002/0162357 | A1* | 11/2002 | Tennent | C03B 19/106 65/17.4 |
| 2004/0091798 | A1* | 5/2004 | Moore | C03B 19/1453 430/5 |
| 2010/0007887 | A1 | 1/2010 | Aldred | |
| 2015/0030834 | A1 | 1/2015 | Morey et al. | |
| 2015/0300961 | A1* | 10/2015 | Shah | G01N 21/8803 356/35.5 |

FOREIGN PATENT DOCUMENTS

| | | | |
|---|---|---|---|
| CN | 102226771 | A | 10/2011 |
| CN | 203772660 | U | 8/2014 |
| CN | 104553189 | A | 4/2015 |
| DE | 19631163 | A1 * 2/1998 ........... G01N 21/958 |
| DE | 102015004109 | A1 | 10/2015 |
| EP | 978717 | A1 | 2/2000 |
| WO | 2008099219 | A1 | 8/2008 |
| WO | 2014107640 | A1 | 7/2014 |

OTHER PUBLICATIONS

Machine English Translation of DE19631163 (Year: 1998).*
Machine English Translation of DE102015004109A1 (Year: 2015).*
English Translation of CN101655352 (Year: 2011).*
Chaparala et al; "Dynamics Behavior of Flat Glass Panels Under Impact Conditions: Experiments and Numerical Modeling"; Journal of SID 23/3, 2015; pp. 97-106.
International Search Report and Written Opinion of the International Searching Authority; PCT/US2016/060489; dated Feb. 14, 2017; 14 Pages; European Patent Office.
Chinese Patent Application No. 201680067597.9; English Translation of the First Office Action dated Sep. 16, 2019; China Patent Office; 17 Pgs.
English Translation of CN201680067597.9 Office Action dated Aug. 21, 2020; 13 Pages; Chinese Patent Office.

\* cited by examiner

APPARATUS AND METHODS TO DETERMINE STRESSES IN COVER GLASS OF HANDHELD DEVICES

CROSS-REFERENCE TO RELATED APPLICATIONS

This application claims is a national stage entry of International Patent Application Serial No. PCT/US16/60489 filed on Nov. 04, 2016, which claims the benefit of priority under 35 U.S.C. § 119 of U.S. Provisional Application Ser. No. 62/256,855 filed on Nov. 18, 2015, the content of which is relied upon and incorporated herein by reference in its entirety.

FIELD

Embodiments of the disclosure generally relate to apparatus and methods for determining stress. More particularly, embodiments of the disclosure are directed to apparatus and methods for determining stress in a cover glass of a handheld device.

BACKGROUND

Knowledge of stresses generated in cover glass in a drop event is one element considered during product design. Currently there are no tools and/or methods to directly measure stresses generated in a cover glass during a drop event. Traditional methods for measuring stresses use optical techniques with lasers and transducers or strain gauges attached to the cover glass. These techniques do not truly reflect an actual drop event because of the cumbersome use of the gauge attachments and wires. Other disadvantages of traditional techniques include, but are not limited to, non-location specific stress measurements. The stress value obtained by these measurements represents an average value over the gauge length or area not area-specific measurements.

Therefore, there is a need in the art for apparatus and methods for measuring the actual stress experienced by cover glass of a handheld device during a drop event.

SUMMARY OF THE CLAIMS

One or more embodiments of the disclosure are directed to apparatus for measuring stress incurred by a cover glass of a handheld device when the cover glass contacts a surface during a drop event. The apparatus comprises a transparent solid piece of material having a drop surface and a back surface opposite the drop surface. The drop surface is oriented to receive a dropped handheld device having a cover glass such that the cover glass contacts the drop surface. At least two optical detectors are directed at the back surface of the transparent solid piece of material to obtain image data including a plurality of pixel points. A processor is configured to track each pixel point using the image data and to correlate deformations on the cover glass to stress and/or strain on the cover glass.

Additional embodiments of the disclosure are directed to apparatus for measuring stress incurred by a cover glass of a handheld device when the cover glass contacts a surface during a drop event. The apparatus comprise a transparent solid piece of material comprising high-purity fused silica having a drop surface and a back surface opposite the drop surface. The drop surface is oriented to receive a dropped handheld device having a cover glass such that the cover glass contacts the drop surface. The drop surface and the back surface are substantially parallel to each other and each of the drop surface and the back surface are substantially flat. At least two optical detectors comprising high-speed cameras are directed at the back surface to obtain image data including a plurality of pixel points. The high-speed cameras have a frame rate less than or equal to about 1 millisecond. Each of the at least two optical detectors has a field of view and the field of view of one optical detector overlaps the field of view of another optical detector in the range of about 50% to about 90%. A non-laser light source is positioned to illuminate the transparent solid piece of material. A processor is configured to track each pixel point using the image data and to correlate deformations on the cover glass to stress and/or strain on the cover glass.

Further embodiments of the disclosure are directed to methods for measuring stress incurred by a cover glass of a handheld device when the cover glass contacts a surface during a drop event. A handheld device is dropped onto a transparent solid piece of material having a drop surface and a back surface opposite the drop surface. The drop surface is oriented horizontally such that the cover glass contacts the drop surface. Image data including a plurality of pixel points is obtained using at least two optical detectors directed at the back surface. Deformations on the cover glass are correlated to stress and/or strain on the cover glass using the pixel points of the image data.

BRIEF DESCRIPTION OF THE DRAWINGS

The accompanying figures, which are incorporated in and constitute a part of this specification, illustrate several embodiments described below.

DETAILED DESCRIPTION

Figure 1:
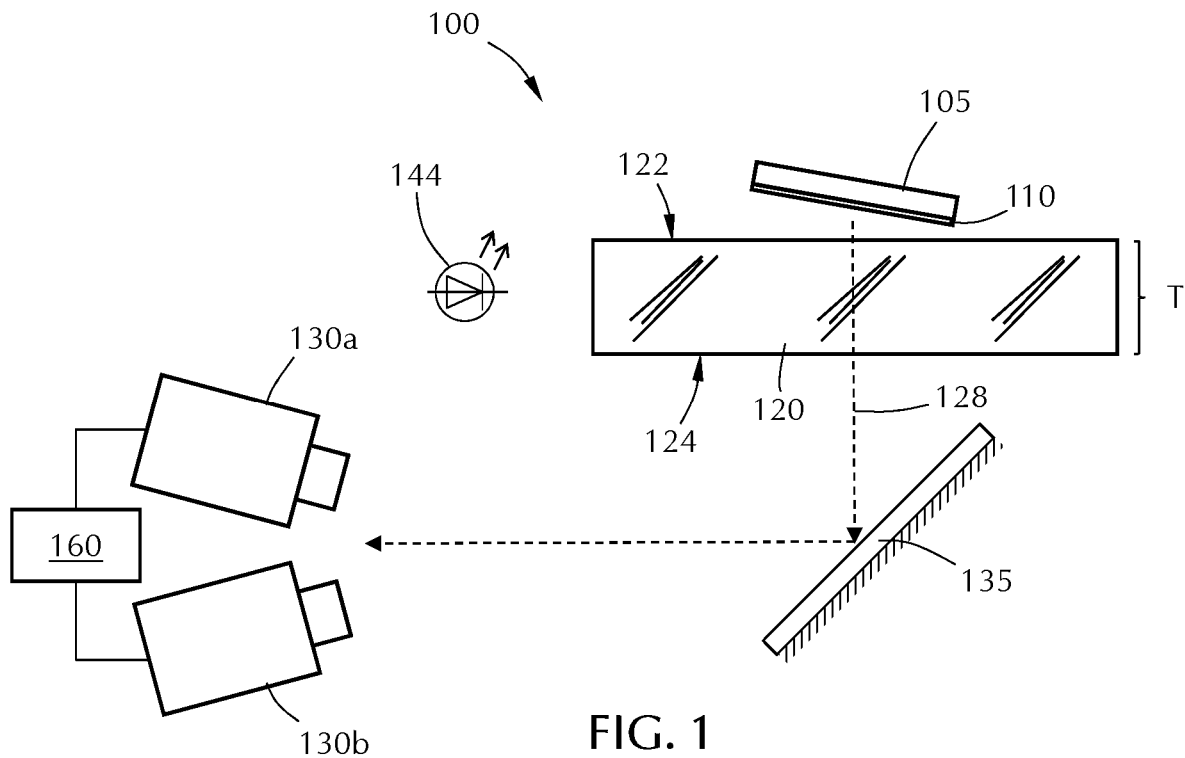
FIG. 1 shows a schematic of an apparatus to measure stress in a drop event in accordance with one or more embodiment of the disclosure.

Embodiments of the disclosure address measurement of actual stresses experienced by cover glass components of handheld devices when the cover glass contacts a surface during a drop event. In contrast to traditional techniques, embodiments of the disclosure facilitate non-contact measurements of the stresses in the field of view of the cameras. Some embodiments of the disclosure allows measurement of the deformation at each point of the cover glass and measurements of actual stresses experienced by the glass in a drop event may be obtained. The cover glass may be a non-strengthened glass or strengthened glass which can be, for example, chemically and/or thermally strengthened. For example, the cover glass may be Corning Gorilla® glass. As used herein, "handheld device" includes, but is not limited to a mobile telephone, a reading device, a music device, a viewing device and a navigation device. Non-limiting examples of such devices are iPhone®, Nook®, iPod®, iPad®, Droid®, Kindle® and GPS navigation systems.

Embodiments of the disclosure comprise apparatus and methods to measure stresses experienced by a cover glass of a device, for example, a handheld device, when the cover glass contacts a surface during a drop event. The measurement apparatus comprises a transparent block of material (e.g., a high-purity fused silica block) which serves as a drop surface. The transparent block of material may also act as a lens. Two high-speed cameras, or more, can be directed toward the back surface of the block of material to facilitate capturing the drop event on the front surface of the block. In some embodiments, correlation algorithms may be used to quantify the deformations in the cover glass and measure strain and/or stress experienced by the cover glass during the drop event.

Some embodiments of the disclosure provide apparatus and/or methods to measure stresses generated during a drop event on cover glass in a full-field approach without the need for contact sensors. Traditional techniques averages strain/stress measurements over a certain length or area such as the gauge length of a strain gauge. One or more embodiments of the disclosure allow for the measurement of strain and/or stress at each location of the cover glass. For example, the strain/stress can be measured at each pixel observed by a camera, or at a subset of pixels.

Embodiments of the disclosure measure deformation in the field of view of optical detectors (e.g., cameras) in a non-contact process. According to some embodiments, the apparatus can measure deformation at each point of the cover glass and can allow for the measurement of actual stresses generated in the cover glass during a drop event. Some embodiments of the disclosure allow for the measurement of peak stress on the cover glass. A drop event is of very short duration and stresses are localized in the area of impact. With traditional techniques, such as using strain gauges, measurement of peak stresses is not feasible because strain gauges can only measure average stresses in the gauge area. In addition, strain gauges could potentially introduce flaws during the attachment and could under-estimate the surface strength significantly. Conventional optical techniques use lasers and have stringent requirements on the experimental parameters for the measurements. Embodiments of the disclosure provide apparatus and methods that are less demanding and can be easily applied to most engineering materials. Some embodiments use a normal light source so that lasers may not be needed.

FIG. 1 is a schematic representation of a measurement apparatus 100 in accordance with one or more embodiments of the disclosure. The apparatus 100 can be used to measure stress incurred on a cover glass 110 of a handheld device 105 as a result of a drop event. As used in this regard, a "drop event" includes the device approaching the drop surface, the cover glass of the device impacting the drop surface and the device rebounding from the drop surface after the impact. The cover glass 110 shown on the handheld device 105 in FIG. 1 has an exaggerated thickness for illustrative purposes only. The thickness of the cover glass 110 can be any suitable thickness for a handheld device 105 and should not be limited by the relative dimensions of the illustrations.

The apparatus 100 includes a transparent solid piece of material 120. The solid piece of material 120 may also be referred to as a block of solid material. The material 120 has a drop surface 122 and a back surface 124 that is opposite the drop surface. The distance between the drop surface 122 and the back surface 124 defines a thickness T of the transparent solid piece of material 120.

The drop surface 122 is oriented to receive a dropped handheld device 105 which has a cover glass 110 so that the cover glass 110 contacts the drop surface 122. The orientation of the drop surface 122 can be horizontally aligned so that a dropped object contacts the drop surface 122 at an angle of substantially 90° (normal to the surface). In some embodiments, the drop surface 122 is aligned at an angle relative to horizontal so that a dropped object contacts the drop surface 122 at an angle in the range of about 5° to about 175°, or in the range of about 15° to about 165°, or in the range of about 30° to about 150°, or in the range of about 45° to about 135°, or in the range of about 60° to about 120°, or in the range of about 75° to about 105°, or in the range of about 80° to about 100°, or in the range of about 85° to about 95°, where the surface normal is defined as 90°.

In some embodiments, upon initial contact of the cover glass 110 of the dropped handheld device 105 with the drop surface 122, the major plane of the cover glass 110 forms an angle with the drop surface 122 in the range of about 0° to about 90°. An angle of 0° is formed where the cover glass 110 contacts face-to-face with the drop surface 122. An angle of 90° is formed where the major plane of the cover glass 110 is normal to the major plane of the drop surface 122. In various embodiments, upon initial contact, the major plane of the cover glass 110 forms an angle with the major plane of the drop surface 122 of less than about 45°, 30°, 15°, 10° or 5°.

The transparent solid piece of material 120 can be made of any suitable material that has sufficient hardness and optical qualities. The material 120 can serve as both a drop surface and as a lens through which the drop event is monitored. In some embodiments, the transparent solid piece of material 120 comprises one or more of high purity fused silica, glass or ceramic materials (e.g., sapphire and MgO). In one or more embodiments, the transparent solid piece of material 120 comprises high purity fused silica. The thickness T of the material 120 can vary depending on, for example, the hardness and transparency of the material. In some embodiments, the material 120 has a thickness in the range of about 10 mm to about 100 mm, or in the range of about 15 mm to about 90 mm, or in the range of about 20 mm to about 80 mm, or in the range of about 25 mm to about 75 mm, or in the range of about 30 mm to about 70 mm, or in the range of about 35 mm to about 65 mm, or in the range of about 40 mm to about 60 mm.

The optical quality of the transparent solid piece of material 120 should be sufficient to allow the majority of light, as illustrated by line 128, to pass through the material 120. In some embodiments, the transparent solid piece of material 120 comprises a substrate that does not substantially distort or scatter light passing therethrough. As used in this regard, the term "does not substantially distort or scatter light passing therethrough" means that less than about 25% of the light passing through the material 120 is distorted or scattered and either not measured or not measured correctly.

In some embodiments, the drop surface 122 and the back surface 124 of the material 120 are substantially parallel to each other. As used in this regard, the term "substantially parallel" means that the thickness T of the portion of the material contacted by the device 105 does not vary by more than about 5% relative to the average thickness T.

In one or more embodiments, each of the drop surface 122 and the back surface 124 are substantially flat. As used in this regard, the term "substantially flat" means that the average surface roughness $R_a$ is less than or equal to about 700Å as measured by atomic force microscopy (AFM). In some embodiments, the drop surface 122 has a roughened surface with an average surface roughness $R_a$ greater than or equal to about 1,000 Å, 2,000 Å, 10,000 Å or 100,000 Å.

The apparatus 100 includes at least two optical detectors 130a, 130b directed at the back surface 124 of the material 120. The optical detectors 130a, 130b shown in FIG. 1 are directed toward a mirror 135 so that light passing through the material 120 is redirected by the mirror 135 toward the optical detectors 130a, 130b. In some embodiments, a mirror is positioned to allow at least one of the optical detectors to be located at an angle normal to the drop surface.

Each of the optical detectors 130a, 130b has a field of view and can obtain image data which includes a plurality of pixel points. In some embodiments, the optical detectors 130a, 130b comprise high-speed cameras. In one or more embodiments, the high-speed camera has a frame rate equal to or greater than 1,000 frames/second (fps), or greater than or equal to about 1,100 fps, 2,000 fps, 3,000 fps, 4,000 fps, 5,000 fps, 6,000 fps, 7,000 fps, 7,500 fps, 8,000 fps, 10,000 fps, 25,000 fps, 75,000 fps, 250,000 fps or 1,000,000 fps. In some embodiments, the high-speed camera takes at least about 1 frame for every millisecond, or 900 µsecond, or 500 µsecond, or 250 µsecond, 100 µsecond, 50 µsecond, 5 µsecond or 1 µsecond. The frame rate is defined as the amount of time taken between two sequential images. A non-limiting example of a suitable high-speed camera is Vision Research V711 (8000) fps.

The optical detectors 130a, 130b (e.g., high-speed CCD cameras) can be stationed behind the back surface 124 of material (e.g., a fused silica block) while the drop event takes place at the front surface (i.e., the drop surface 122) of the material. The high-speed cameras can be turned on for the drop event and continuous images can be captured at frame rates lower than 1 millisecond per frame for the entire drop event.

Figure 2:
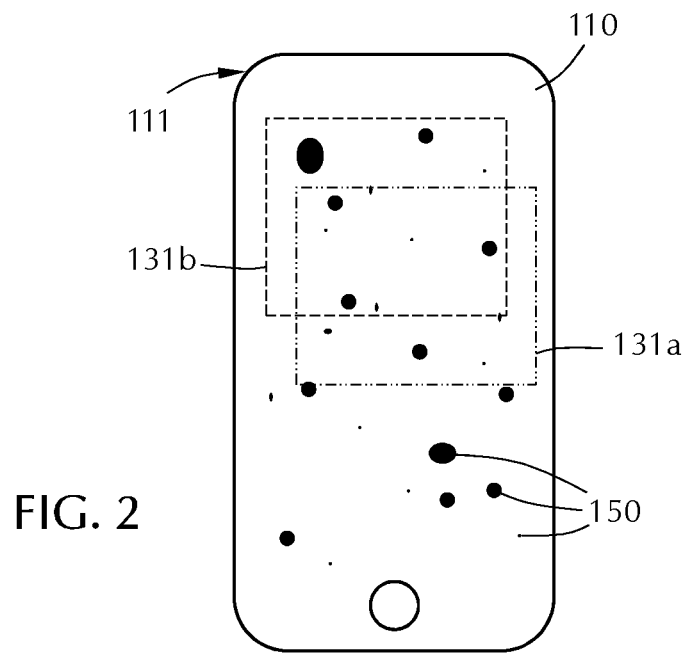
FIG. 2 shows a cover glass with a speckled pattern in accordance with one or more embodiment of the disclosure.

The field of view of the optical detectors can overlap completely or can be offset partially or totally. Referring to FIG. 2, a cover glass 110 of a device is illustrated showing fields of view 131a, 131b for two optical detectors 130a, 130b. The embodiment shown includes two fields of view but it will be understood by those skilled in the art that there can be any suitable number of optical detectors with independent fields of view. In some embodiments, the fields of view of all of the optical detectors are substantially the same. As used in this regard, the term "substantially the same" means that the fields of view have greater than or equal to about 95% the same image area. In one or more embodiments, the fields of view of each of the optical detectors are different. In various embodiments, there are multiple optical detectors with at least two having substantially the same fields of view and at least two having different fields of view. In certain embodiments, the apparatus 100 has at least two optical detectors with each having a field of view and the field of view of one optical detector overlaps the field of view of another optical detector in the range of about 20% to about 90%, or in the range of about 30% to about 80%, or in the range of about 40% to about 70%, or in the range of about 50% to about 90%. In certain embodiments, about ⅓ of the field of view of at least one optical detector is not overlapped by another field of view of another optical detector. In various embodiments, at least about ¼, ⅓, ½, ⅔ or ¾ of the field of view of at least one optical detector is not overlapped by another field of view of another optical detector.

The optical detectors 130a, 130b can be positioned to include the entire handheld device 105 in the field of view or only a portion of the device. FIG. 2 shows two fields of view 131a, 131b in which each encompasses only a portion of the device. In some embodiments, the field of view of one or more of the optical detectors encompasses at least one edge 111 of the cover glass 110. In one or more embodiments, the field of the view of one or more of the optical detectors encompasses the entire cover glass 110 so that all of the edges of the device 105 or cover glass 110 are within the field of view.

The position of the optical detectors 130a, 130b relative to each other can be varied to provide different fields of view. For example, a first optical detector 130a may be positioned about two feet away from the second optical detector 130b. Both the first optical detector 130a and the second optical detector 130b can be angled toward the center of the drop surface 122.

Referring back to FIG. 1, some embodiments of the apparatus 100 include a light source 144. The light source 144 can be any suitable light source that can provide sufficient illumination to allow measurement with the optical detectors 130a, 130b. In some embodiments, the light source 144 comprises a non-laser light source to illuminate the transparent solid piece of material 120. A non-laser light source, as used in this regard, is any diffuse light source. The light source 144 can be a white light source having a broad wavelength spectrum or a light source with a narrow wavelength range. In some embodiments, the light source 144 comprises a light-emitting diode (LED). Suitable LEDs include metal based devices as well as organic light-emitting diodes (OLEDs). The color or wavelength of the LED can be varied depending on, for example, the optical detectors used and/or the cover glass 110 composition or a surface treatment on the cover glass 110. In some embodiments, the light source 144 comprises at least one LED having a wavelength corresponding to red (650±50 nm).

The apparatus 100 includes a processor 160 connected to at least the optical detectors 130a, 130b. The processor 160 includes hardware that allows the processor to interface with the optical detectors 130a, 130b. Non-limiting examples of the hardware include input/output devices, circuits, memory, storage, display and electrical connectivity. The processor 160 is adapted to receive image data from the optical detectors 130a, 130b. Image data includes at least one image obtained by the detector representing the apparatus 100 at a fixed point in time during the drop event. A video obtained with the optical detector can be separated into individual images representative of a fixed time point. For example, a one second long video obtained by an optical detector having a frame rate of one millisecond will generate 1000 individual images. The image data includes a plurality of pixel points based encompassing the field of view of the detector. The processor 160 can be configured to track each pixel point using image data to correlate deformations on the cover glass 110 to stress and/or strain on the cover glass 110.

In some embodiments, deformation data is obtained by tracking each pixel point using two images. One image serves as the reference state and the other as a final state (at a fixed point in time) of the object using a correlation algorithm. The intensity (gray value) of each pixel, either at the reference/final state, is often not a unique number and thus, neighboring pixels are taken into account during the data evaluation process. Such a collection of pixels is referred to as a subset or correlation window. Stress/strain on the cover glass for the drop event can be obtained by quantifying the deformations by using correlation algorithm. Some embodiments can measure deformation at each point with relatively high measure of accuracy (few microns, depending field of view). In some embodiments, the deformation of the cover glass during the drop event is measured with an accuracy of less than or equal to about 5 µm.

In some embodiments, correlation between the two images (reference/final state) from the two cameras is enhanced by putting a random speckle pattern on the cover glass. The optical detectors, coupled with correlation algorithms, allows for measurement in a full-field and non-contact approach. In some embodiments, the correlation process uses the calibration information to record the relative position of each pixel or block of pixels in the image. The image can be divided into a plurality of smaller regions which can be tracked as the object moves. When a speckle pattern is used, the algorithm might incorporate speckle pattern matching into the image tracking. The change in pixel position from frame to frame can be calculated to determine the displacement of the pixels. The stress and strain can also be calculated using the displacement information and one or more material properties, for example, elastic modulus, Poisson ratio or sample dimensions.

Referring to FIG. 2, the cover glass may include a plurality of speckles 150. The speckles can be any shape or size and can be random patterns. The speckles 150 can be used to compare the reference/sample images to increase the accuracy the pixel-to-pixel accuracy of the measurement. The random pattern of speckles 150 can be used to correlate the pixel mapping of the reference image to the sample image. In some embodiments, the plurality of speckles 150 comprises random black spots on a white background. Some embodiments of the apparatus 100 include a red light-emitting diode directed to illuminate the transparent solid piece of material while a handheld device 105 with a cover glass 110 having random black speckles 150 on a white background is subjected to a drop event.

Some embodiments of the disclosure are directed to methods for measuring stress incurred by a cover glass 110 of a handheld device 105 when the cover glass 110 contacts a surface during a drop event. A handheld device 105 is dropped onto a transparent solid piece of material 120 so that the cover glass 110 contacts a drop surface 122 of the material 120. The device 105 can be dropped manually or with use of an automated system. The automated system may include a drop component that supports the device until the drop event begins. Once the drop event begins, the drop component supporting the device releases the device to allow gravity to control the descent of the device to the drop surface 122. The drop component can be connected to and controlled by the processor 160 to allow simultaneous dropping and the onset of image capture.

The device 105 can be dropped to land substantially flat on the drop surface 122. As used in this regard, the term "substantially flat" means that the major plane of the cover glass 110 is within one degree of being coplanar with the major plane of the drop surface 122.

In some embodiments, the device 105 is dropped at an angle to the drop surface 122 so that the device makes initial contact with the drop surface 122 on an end, edge or corner of the device. The major plane of the cover glass 110 relative to the major plane of the drop surface 122 is greater than or equal to about 5°, 10°, 15°, 20°, 25° or 30°.

Image data including a plurality of pixel points is obtained using at least two optical detectors 130a, 130b. The optical detectors 130a, 130b have a field of view directed at a back surface 124 of the material 120. The back surface 124 of the material 120 is opposite the drop surface 122 so that the image data is collected through the material 120.

Deformations of the cover glass 110 are correlated to stress and/or strain on the cover glass 110 using the pixel points of the image data. In some embodiments, a speckled pattern is applied to the cover glass 110 prior to the drop event. The speckled pattern can be incorporated in the determination of the deformation by aligning the pixel mapping of the reference and sample images. In one or more embodiments, the speckled pattern is applied to the cover glass 110 as a plurality of black spots on a white background.

The drop event can be measured in ambient conditions using ambient lighting. In some embodiments, the drop event is measured while illuminating the block of material 120 with a diffuse light source, such as an LED. In some embodiments, the LED is red and the cover glass 110 has a black speckled pattern on a white background.

While the foregoing is directed to various embodiments, other and further embodiments of the disclosure may be devised without departing from the basic scope thereof, and the scope thereof is determined by the claims that follow.

What is claimed is:

1. An apparatus for measuring stress incurred by a cover glass of a handheld device during a drop event, the cover glass comprising a plurality of speckles, the apparatus comprising:
    a transparent solid piece of material having a drop surface and a back surface opposite the drop surface, the drop surface oriented to receive the handheld device such that the cover glass contacts the drop surface during the drop event;
    at least two optical detectors directed at the back surface of the transparent solid piece of material to obtain sequential image data at a frame rate for the entirety of the drop event and the sequential image data including a plurality of pixel positions on the cover glass; and
    a processor adapted to receive the image data from the at least two optical detectors and configured to determine a change in the plurality of pixel positions using the image data and to correlate deformations on the cover glass to stress and/or strain on the cover glass,
    wherein the drop event comprises the device approaching the drop surface, the cover glass of the device impacting the drop surface and the device rebounding from the drop surface after the impact.

2. The apparatus of claim 1, wherein the at least two optical detectors comprise high-speed cameras having a frame rate less than or equal to 1 millisecond.

3. The apparatus of claim 1, wherein each of the at least two optical detectors has a field of view and the field of view of one optical detector overlaps the field of view of another optical detector in the range of 50% to 90%.

4. The apparatus of claim 1, further comprising a mirror positioned to allow at least one of the optical detectors to be located at an angle normal to the drop surface.

5. The apparatus of claim 1, further comprising a non-laser light source to illuminate the transparent solid piece of material.

6. The apparatus of claim 1, wherein each of the drop surface and the back surface of the transparent solid piece of material is substantially flat.

7. The apparatus of claim 1, wherein the drop surface and the back surface of the transparent solid piece of material are substantially parallel.

8. The apparatus of claim 1, wherein the transparent solid piece of material comprises high-purity fused silica.

9. The apparatus of claim 1, wherein the deformations are measured with an accuracy of less than or equal to 5 μm.

10. The apparatus of claim 1, wherein the cover glass comprises a plurality of speckles and correlating deformations further comprises comparing speckles in a sample image with speckles in a reference image.

11. The apparatus of claim 10, wherein the plurality of speckles comprise random black spots on a white background.

12. The apparatus of claim 11, further comprising a red light-emitting diode directed to illuminate the transparent solid piece of material.

13. The apparatus of claim 1, wherein the transparent solid piece of material does not substantially distort or scatter light passing therethrough.

14. An apparatus for measuring stress incurred by a cover glass of a handheld device during a drop event, the cover glass comprising a plurality of speckles, the apparatus comprising:
- a transparent solid piece of material comprising high-purity fused silica having a drop surface and a back surface opposite the drop surface, the drop surface oriented to receive the handheld device such that the cover glass contacts the drop surface during the drop event, the drop surface and the back surface substantially parallel to each other and each of the drop surface and the back surface are substantially flat;
- at least two optical detectors comprising high-speed cameras directed at the back surface of the transparent material to obtain image data including sequential image data of a plurality of pixel positions on the cover glass for the entirety of the drop event, the high-speed cameras having a frame rate less than or equal to 1 millisecond, each of the at least two optical detectors having a field of view and the field of view of one optical detector overlaps the field of view of another optical detector in the range of 50% to 90%;
- a non-laser light source positioned to illuminate the transparent solid piece of material; and
- a processor adapted to receive the image data from the at least two optical detectors and configured to determine a change in the plurality of pixel positions using the sequential image data and to correlate deformations on the cover glass to stress and/or strain on the cover glass,
- wherein the drop event comprises the device approaching the drop surface, the cover glass of the device impacting the drop surface and the device rebounding from the drop surface after the impact.

15. A method for measuring stress incurred by a cover glass of a handheld device comprising a plurality of speckles when the cover glass contacts a surface during a drop event, the method comprising:
- dropping the handheld device onto a transparent solid piece of material having a drop surface and a back surface opposite the drop surface, the drop surface oriented horizontally such that the cover glass contacts the drop surface;
- obtaining sequential image data at a frame rate including a plurality of pixel positions on the cover glass using at least two optical detectors directed at the back surface of the transparent material for the entirety of the drop event; and
- correlating deformations on the cover glass to stress and/or strain on the cover glass using the change in the plurality of pixel positions of the image data,
- wherein the drop event comprises the device approaching the drop surface, the cover glass of the device impacting the drop surface and the device rebounding from the drop surface after the impact.

16. The method of claim 15, wherein correlating deformations is performed by comparing image data from a sample image to image data from a reference image.

17. The method of claim 16, wherein the cover glass comprises a plurality of speckles and correlating deformations using the change in plurality of pixel positions of the image data, further comprises comparing the plurality of speckles in the sample image and the reference image.

18. The method of claim 17, further comprising providing a plurality of random black speckles on a white background on the cover glass.

19. The method of claim 18, further comprising directing a red light toward the cover glass during the drop event.

20. The method of claim 15, wherein the at least two optical detectors comprise high-speed cameras having a frame rate less than or equal to 1 millisecond.

* * * * *

UNITED STATES PATENT AND TRADEMARK OFFICE
CERTIFICATE OF CORRECTION

PATENT NO. : 10,955,311 B2  
APPLICATION NO. : 15/777451  
DATED : March 23, 2021  
INVENTOR(S) : Prakash Chandra Panda et al.

Page 1 of 1

It is certified that error appears in the above-identified patent and that said Letters Patent is hereby corrected as shown below:

On the Title Page

In Column 2, Item (57), Abstract, Line 1, delete "of for" and insert --for--, therefor.

In the Specification

In Column 1, Line 8, after "This Application" delete "claims".

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*